US009720779B2

(12) United States Patent
Kuo (10) Patent No.: US 9,720,779 B2
(45) Date of Patent: Aug. 1, 2017

(54) BACKUP SYSTEM AND BACKUP METHOD THEREOF

(71) Applicant: Institute For Information Industry, Taipei (TW)

(72) Inventor: Yen-Hung Kuo, Taipei (TW)

(73) Assignee: Institute For Information Industry, Taipei (TW)

( * ) Notice: Subject to any disclaimer, the term of this patent is extended or adjusted under 35 U.S.C. 154(b) by 320 days.

(21) Appl. No.: 14/555,577

(22) Filed: Nov. 27, 2014

(65) Prior Publication Data
US 2016/0154704 A1 Jun. 2, 2016

(51) Int. Cl.
G06F 17/00 (2006.01)
G06F 11/14 (2006.01)
G06F 11/20 (2006.01)

(52) U.S. Cl.
CPC ...... *G06F 11/1451* (2013.01); *G06F 11/2058* (2013.01); *G06F 11/2087* (2013.01); *G06F 11/2069* (2013.01)

(58) Field of Classification Search
CPC .... G06F 17/30; G06F 17/00; G06F 17/30575; G06F 11/1451
USPC ................................................ 707/600–899
See application file for complete search history.

(56) References Cited

U.S. PATENT DOCUMENTS

2015/0244795 A1* 8/2015 Cantwell ............ H04L 67/1095
709/202

FOREIGN PATENT DOCUMENTS

| CN | 101577735 A | 11/2009 |
| CN | 101706805 B | 11/2011 |
| TW | 201007549 A | 2/2010 |

OTHER PUBLICATIONS

Office Action to the corresponding Taiwanese Patent Application rendered by the Taiwan Intellectual Property Office (TIPO) on Nov. 24, 2015, 9 pages (including English translation).

* cited by examiner

*Primary Examiner* — Isaac M Woo
(74) *Attorney, Agent, or Firm* — Skaar Ulbrich Macari, P.A.

(57) ABSTRACT

A backup system and a backup method thereof are provided. The backup system includes an operational storage, a backup storage, a service client, a metadata server and a backup client. The service client accesses the operational storage according to an operational storage layout metadata and makes a data change to the operational storage to transmit a metadata update request. The metadata server receives the metadata update request from the service client, updates a local operational storage layout metadata in response to the data change according to the metadata update request, acknowledges the metadata update request and instructs the backup client to back up the data change of the operational storage to the backup storage according to the metadata update request.

8 Claims, 4 Drawing Sheets

BACKUP SYSTEM AND BACKUP METHOD THEREOF

FIELD

The present invention relates to a backup system and a backup method thereof. In particular, the backup system and the backup method of the present invention relates to a pNFS based backup system.

BACKGROUND

Nowadays, backup technology has been broadly used in the information technology. Traditional backup systems back up data with a fixed time interval, which creates a time gap between the last and the next backup time. However, if any system failure occurred in the foregoing time gap, the data changes happened in between the last backup and the failure event will not be able to be recovered.

Moreover, the prior art backup systems usually support incremental backup. With incremental backup, only changed data will be backed up for less storage and network consumption. However, to identify changed data requires additional comparisons and calculations which usually need more storage and computing resources to perform.

When executing data restore process, the prior art backup systems allow restore the metadata of the backup data firstly for a faster data restore. However, behind the faster data restore, the whole backup data still need to be asynchronously transferred from a backup storage to a restore target, which usually takes a long time to process. Before the backup data being fully restored, the system using the restored storage cannot get the same storage access performance as the system operated before the failure event.

Accordingly, to provide a better backup method for avoiding the aforementioned problems is needed in this field.

SUMMARY

An objective of the present invention includes providing a backup system and a backup method thereof for use in a backup system, which provides a real-time backup method.

To achieve the aforesaid objective, certain embodiments of the present invention include a backup system. The backup system comprises an operational storage, a backup storage, a service client, a metadata server and a backup client. The service client accesses the operational storage according to an operational storage layout metadata corresponding to the operational storage. The service client makes a data change to the operational storage, and it then transmits a metadata update request to the metadata server by according to the data change made to the operational storage. When the metadata server receives the metadata update request from the service client, the metadata server updates a local operational storage layout metadata in response to the data change according to the metadata update request, acknowledges the metadata update request, and instructs the backup client to back up the data change of the operational storage to the backup storage according to the metadata update request according to the metadata update request.

To achieve the aforesaid objective, certain embodiments of the present invention include a backup method for use in the foregoing backup system. The backup system comprises an operational storage, a backup storage, a service client, a metadata server and a backup client. The metadata server communicates with the service client and is coupled to the backup client. The backup client is coupled to the operational storage and the backup storage. The service client communicates with the operational storage and is configured to access the operational storage according to an operational storage layout metadata corresponding to the operational storage. The backup method comprises the following steps: marking a data change to the operational storage to transmit a metadata update request to the metadata server by the service client; receiving the metadata update request from the service client by the metadata server; updating a local operational storage layout metadata in response to the data change according to the metadata update request by the metadata server; acknowledging the metadata update request by the metadata server; and instructing the backup client to back up the data change of the operational storage to the backup storage according to the metadata update request by the metadata server.

The detailed technology and preferred embodiments implemented for the subject invention are described in the following paragraphs accompanying the appended drawings for people skilled in this field to well appreciate the features of the claimed invention.

DETAILED DESCRIPTION

Hereinafter, the present invention will be explained with reference to certain example embodiments thereof. It should be appreciated that, these example embodiments are not intended to limit the present invention to any specific examples, embodiments, environment, applications or particular implementations as described in these example embodiments. Therefore, description of these example embodiments is only for purpose of illustration rather than to limit the present invention, and the scope of this application shall be governed by the claims.

In addition, in the following embodiments and the attached drawings, elements not directly related to the present invention are omitted from depiction; and dimensional relationships among individual elements in the following drawings are illustrated only for ease of understanding but not to limit the actual scale.

Figure 1:
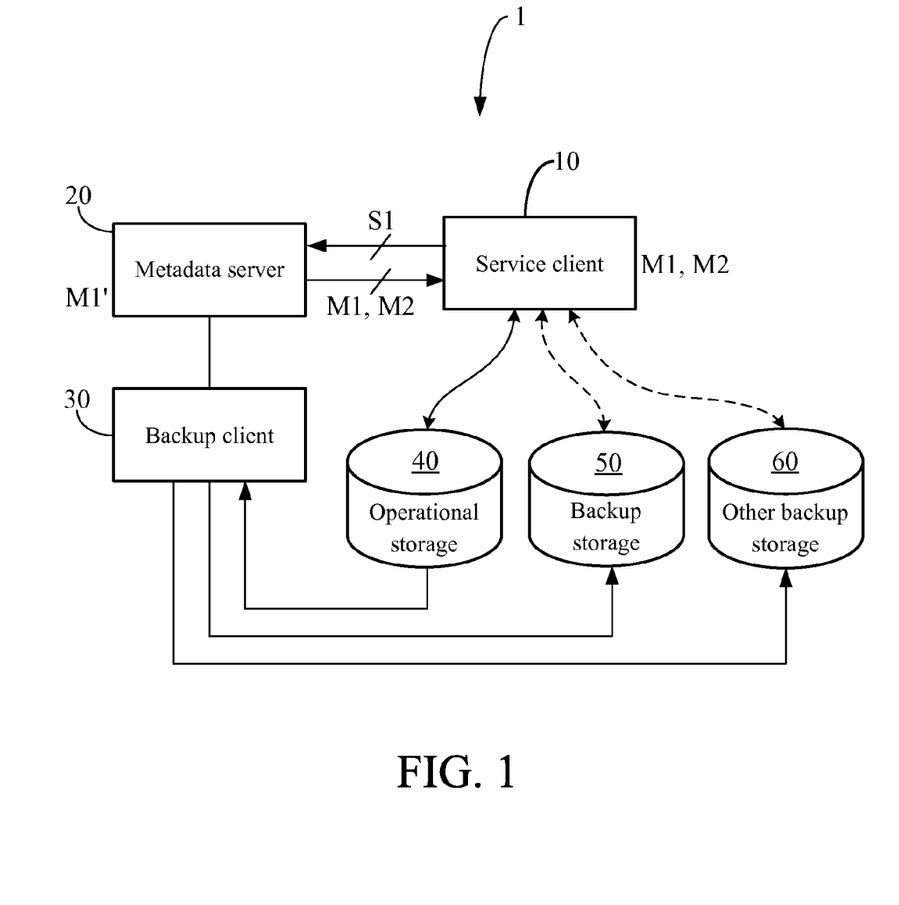
FIG. 1 is a block diagram of a backup system according to a first embodiment of the present invention.

A first embodiment of the present invention is shown in FIG. 1 which depicts a block diagram of a backup system 1. The backup system 1 can support multiple protocols, for example, a parallel network file system (pNFS) that provides storage services in a parallel manner.

As shown in FIG. 1, the backup system 1 comprises a service client 10, a metadata server 20, a backup client 30, an operational storage 40 and a backup storage 50. Wherein, the service client 10 communicates with the metadata server 20 and the operational storage 40 respectively.

The service client 10 communicates with the metadata server 20 and the operational storage 40 via a local area network (LAN), a wide area network (WAN), a metropolitan area network (MAN), a global area network such as the Internet, a Fiber Channel fabric, or any combination of such interconnects.

The backup client 30 is coupled with the metadata server 20, the operational storage 40 and the backup storage 50 respectively. For example, the backup client 30 may be electrically coupled with the metadata server 20, the operational storage 40 and backup storage 50.

Specifically, the service client 10 can be a personal computer, an intelligent mobile device, a workstation, a handheld computing device, or the like. The metadata server 20 can be a computing device and is configured to instruct the backup client 30 to implement backup for the backup system 1. The metadata server 20 and the backup client 30 can be hosted on virtual machines (VM) respectively. The operational storage 40 and a backup storage 50 can be hard disks, magnetic disk storage media, optical storage media, storage systems, or the like.

In the very beginning, the metadata server 20 configures the operational storage 40 for the service client 10 and transmits an operational storage layout metadata M1 to the service client 10 so that the service client 10 can access the operational storage 40 according to the operational storage layout metadata M1.

After the service client 10 making a data change to the operational storage 40, it updates the received operational storage layout metadata M1 and then transmits a metadata update request S1 by according to the data change made to the operational storage 40 to the metadata server 20.

Once the metadata server 20 receives the metadata update request S1, the metadata server 20 will firstly update its local operational storage layout metadata M1' in response to the data change according to the metadata update request S1, and then acknowledges the metadata update request S1 and instructs the backup client 30 to back up the data change of the operational storage 40 to the backup storage 50 according to the metadata update request S1. Wherein the operational storage layout metadata M1 updated by the service client 10 is a cached copy of the local operational storage layout metadata M1' updated by the metadata server 20, and the local operational storage layout metadata M1' is a part of whole storage layout metadata stored in the metadata server 20.

In one embodiment, the metadata server 20 instructs the backup client 30 to back up the data change of the operational storage 40 to the backup storage 50 by reading the data change of the operational storage 40 and then writing the read data change into the backup storage 50. Furthermore, if an unusable situation happens on the operational storage 40, a restore procedure will be executed. By the restore procedure, the metadata server 20 configures the backup storage 50 to be a new operational storage to replace the original operational storage 40, and also configures a new backup storage for the backup storage 50.

For more details, the backup system 1 further comprises a other backup storage 60. The other backup storage 60 is coupled to the backup client 30 and is configured to be the new backup storage for the backup storage 50. The metadata server 20 instructs the backup server 30 to back up data of the backup storage 50 to the other backup storage 60.

In the restore procedure, the metadata server 20 distributes a backup storage layout metadata M2 corresponding to the backup storage 50 to the service client 10 to replace the operational storage layout metadata M1. After the service client 10 receiving the backup storage layout metadata M2, the service client 10 can communicate with the backup storage 50 and accesses the backup storage 50 according to the backup storage layout metadata M2.

It should be noted that the restore procedure will not be executed if the unusable situation does not happens on the operational storage 40. With the same concept, the service client may access the other backup storage 60 if the backup storage 50 is unusable.

Figure 2:
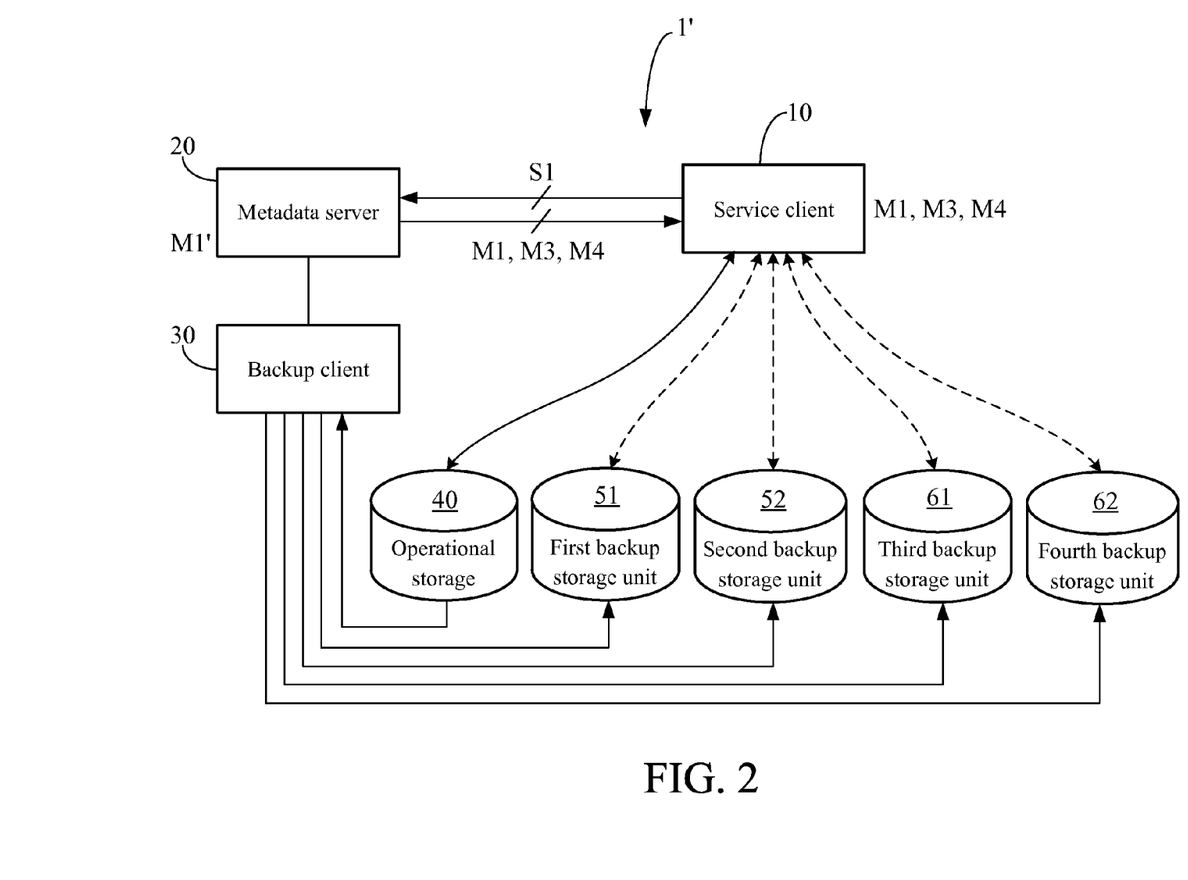
FIG. 2 is a block diagram of a backup system according to a second embodiment of the present invention.

A second embodiment of the present invention is shown in FIG. 2 which depicts a backup system 1'. The difference between the first embodiment and the second embodiment is the number of backup storages. Specifically, in the first embodiment, there is one backup storage unit in the backup system 1. In the second embodiment, there are two backup storage units in the backup system 1'. The details will be described in the following paragraphs.

It should be appreciated that the distributions and functions of the service client 10, the metadata server 20, the backup client 30 and the operational storage 40 of the second embodiment are the same as those of the service client 10, the metadata server 20, the backup client 30 and operational storage 40 of the first embodiment.

In this embodiment, the backup system 1' comprises a backup storage. The backup storage serves as a backup storage set or group and comprises a first backup storage unit 51 and a second backup storage unit 52. The first and second backup storage units 51-52 may be hard disks, magnetic disk storage media, optical storage media, storage systems, or the like.

The first backup storage unit 51 and the second backup storage unit 52 may be located in the same place, or the first backup storage unit 51 may be located close to the operational storage 40 and the second backup storage unit 52 may be remotely located from the operational storage 40.

The service client 10 communicates with the metadata server 20 and the operational storage 40 via a local area network (LAN), a wide area network (WAN), a metropolitan area network (MAN), a global area network, such as the Internet, a Fiber Channel fabric, or any combination of such interconnects.

The backup client 30 is coupled with the metadata server 20, the operational storage 40, the first backup storage unit 51 and the second backup storage unit 52 respectively. For example, the backup client 30 may be electrically coupled with the metadata server 20, the operational storage 40, the first backup storage unit 51 and the second backup storage unit 52.

In the very beginning, an operational storage layout metadata M1 corresponding to the operational storage 40 is distributed to the service client 10 by the metadata server 20.

After the service client 10 making a data change to the operational storage 40, it updates the received operational storage layout metadata M1 and then transmits a metadata update request S1 by according to the data change made to the operational storage 40 to the metadata server 20.

Once the metadata server 20 receives the metadata update request S1, the metadata server 20 will firstly updates its local operational storage layout metadata M1' in response to the data change, and then acknowledges the metadata update request and instructs the backup client 30 to back up the data change of the operational storage 40 to the first backup storage unit 51 and the second backup storage unit 52 according to the metadata update request S1. Wherein the operational storage layout metadata M1 updated by the service client 10 is a cached copy of the local operational storage layout metadata M1' updated by the metadata server 20, and the local operational storage layout metadata M1' is a part of whole storage layout metadata stored in the metadata server 20. In one embodiment, the metadata server 20 instructs the backup client 30 to back up the data change of the operational storage 40 to the first backup storage unit 51 and the second backup storage unit 52 by reading the data change from the operational storage 40 and then writing the read data change into the first backup storage unit 51 and moving cold data from the first backup storage unit 51 to the second backup storage unit 52.

Accordingly, the data stored in the first backup storage unit 51 is the backup data of the hot data which is written and read frequently in the operational storage 40. The data stored in the second backup storage unit 52 is backup data of the cold data which is written and read infrequently in the operational storage 40.

For more details regarding the attributions of the first backup storage unit 51 and the second backup storage unit 52, in one embodiment, the first read/write speed of the first backup storage unit 51 is faster than a second read/write speed of the second backup storage unit 52. In another embodiment, the volume of the first backup storage unit 51 is less than the second backup storage unit 52.

Furthermore, if an unusable situation happens on the operational storage 40, a restore procedure will be executed. By the restore procedure, the metadata server 20 configures the first backup storage unit 51 and the second backup storage unit 52 to be a new operational storage set to replace the original operational storage 40, and also configures a new backup storage for the first backup storage unit 51 and the second backup storage unit 52.

For more details, the backup system 1 further comprises a third backup storage unit 61 and a fourth backup storage unit 62. The backup client 30 is coupled with the third backup storage unit 61 and the fourth backup storage unit 62.

In this embodiment, the third backup storage unit 61 and the fourth backup storage unit 62 is configured to be the new backup storages for the first backup storage unit 51 and the second backup storage unit 52 respectively. The metadata server 20 further instructs the backup server 30 to back up data of the first backup storage unit 51 and the second backup storage unit 52 to the third backup storage unit 61 and the fourth backup storage unit 62 respectively.

In the restore procedure, the metadata server 20 distributes both of a first storage layout metadata M3 corresponding to the first backup storage unit 51 and the second storage layout metadata M4 corresponding to the second backup storage unit 52 to the service client 10 to replace the operational storage layout metadata M1.

After the service client 10 receiving the first storage layout metadata M3 and the second storage layout metadata M4, the service client 10 communicates with the first backup storage unit 51 and the second backup storage unit 52, and it can then access the first backup storage unit 51 and the second backup storage unit 52 according to the first storage layout metadata M3 and the second storage layout metadata M4 respectively.

It should be noted that the restore procedure will not be executed if the unusable situation does not happen on the operational storage 40. With the same concept, the third backup storage unit 61 and the fourth backup storage unit 62 will be used by the service client 10 when the first backup storage unit 51 and the second backup storage unit 52 is unusable.

Figure 3:
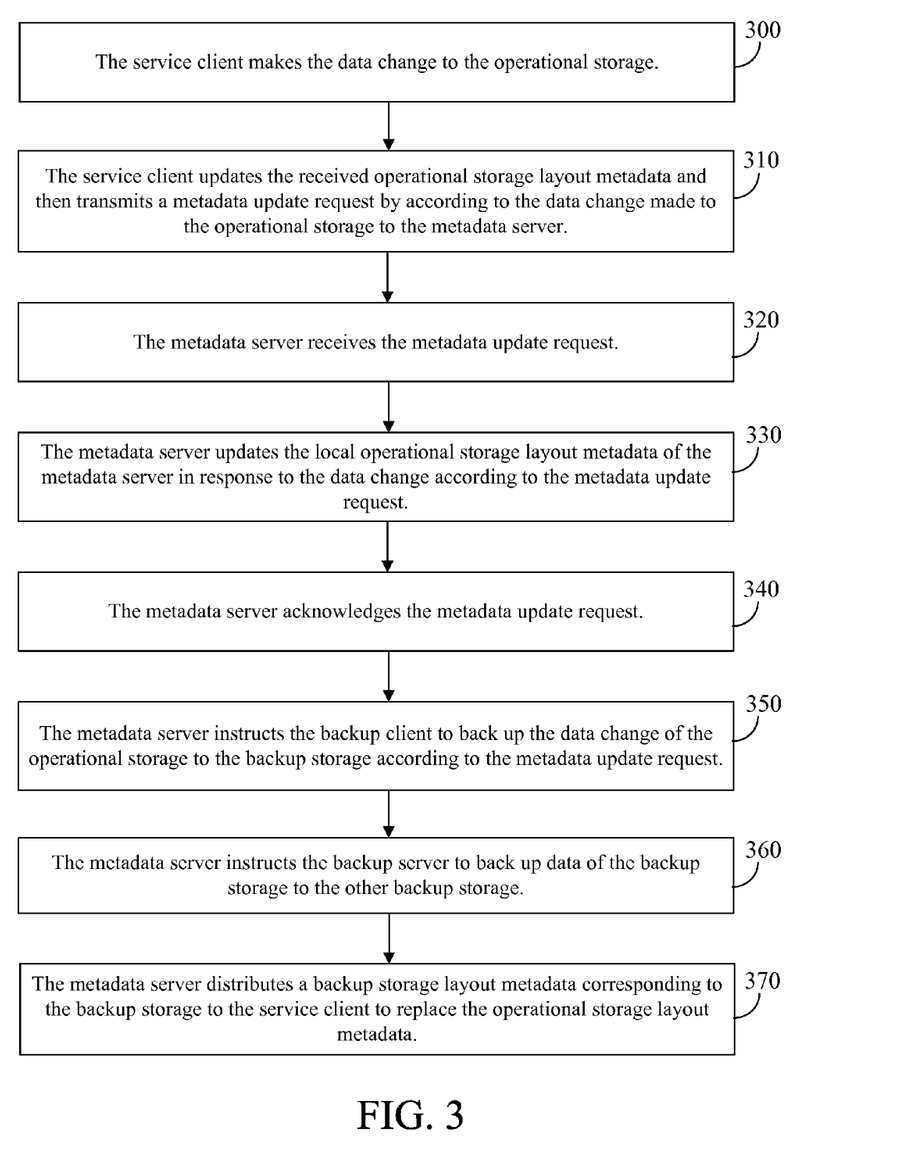
FIG. 3 is a flowchart diagram of a backup method according to a third embodiment of the present invention.

A third embodiment of the present invention is shown in FIG. 3 which depicts a backup method of the present invention. The backup method is used in a backup system which comprises a service client, a metadata server, a backup client, an operational storage and a backup storage.

The service client, the metadata server, the backup client, the operational storage and the backup storage in this embodiment have the same functions as the service client 10, the metadata server 20, the backup client 30, the operational storage 40 and the backup storage 50 of the first embodiment.

The service client communicates with the metadata server and the operational storage via a local area network (LAN), a wide area network (WAN), a metropolitan area network (MAN), a global area network such as the Internet, a Fiber Channel fabric, or any combination of such interconnects.

The backup client is coupled with the metadata server, the operational storage and the backup storage respectively. For example, the backup client may be electrically coupled with the metadata server, the operational storage and the backup storage.

Before the backup method is implemented, the metadata server configures the operational storage for the service client and transmits an operational storage layout metadata to the service client so that the service client can access the operational storage according to the operational storage layout metadata.

After the service client making a data change to the operational storage, the backup method is triggered and executed using the following steps.

First, in the backup method, a step 300 is executed by making the data change to the operational storage by the service client. Next, a step 310 is executed by updating the received operational storage layout metadata and then transmitting a metadata update request by according to the data change made to the operational storage to the metadata server by the service client.

Afterwards, a step 320 is executed by receiving the metadata update request by the metadata server. Then, a step 330 is executed by updating the local operational storage layout metadata of the metadata server in response to the data change according to the metadata update request by the metadata server. Wherein the operational storage layout metadata updated by the service client is a cached copy of the local operational storage layout metadata updated by the metadata server, and the local operational storage layout metadata is a part of whole storage layout metadata stored in the metadata server.

Next, a step 340 is executed by acknowledging the metadata update request by the metadata server. Then, a step 350 is executed by instructing the backup client to back up the data change of the operational storage to the backup storage according to the metadata update request by the metadata server.

In one embodiment of the step 350, the metadata server instructs the backup client to back up the data change of the operational storage to the backup storage by reading the data change of the operational storage and then writing the read data change into the backup storage.

Moreover, if an unusable situation happens on the operational storage, a restore procedure will be executed. By the restore procedure, the metadata server configures the backup storage to be a new operational storage to replace the original operational storage, and also configures a new backup storage for the backup storage.

For more details, the backup system further comprises a other backup storage. The other backup storage is coupled to the backup client and is configured to be the new backup storage for the backup storage. In this case, a step 360 of the backup method is further executed by instructing the backup server to back up data of the backup storage to the other backup storage by the metadata server.

In the restore procedure, a step 370 of the backup method is further executed by distributing a backup storage layout metadata corresponding to the backup storage to the service client to replace the operational storage layout metadata by the metadata server so that the service client communicates with the backup storage, and it can then access the backup storage according to the backup storage layout metadata.

It should be noted that the restore procedure (the steps 360 and 370) will not be executed if the unusable situation does not happen on the operational storage. With the same concept, the service client may access the other backup storage if the backup storage is unusable.

In addition to the aforesaid steps, the backup method of the third embodiment can also execute all the operations and functions of the backup system of the first embodiment.

Figure 4:
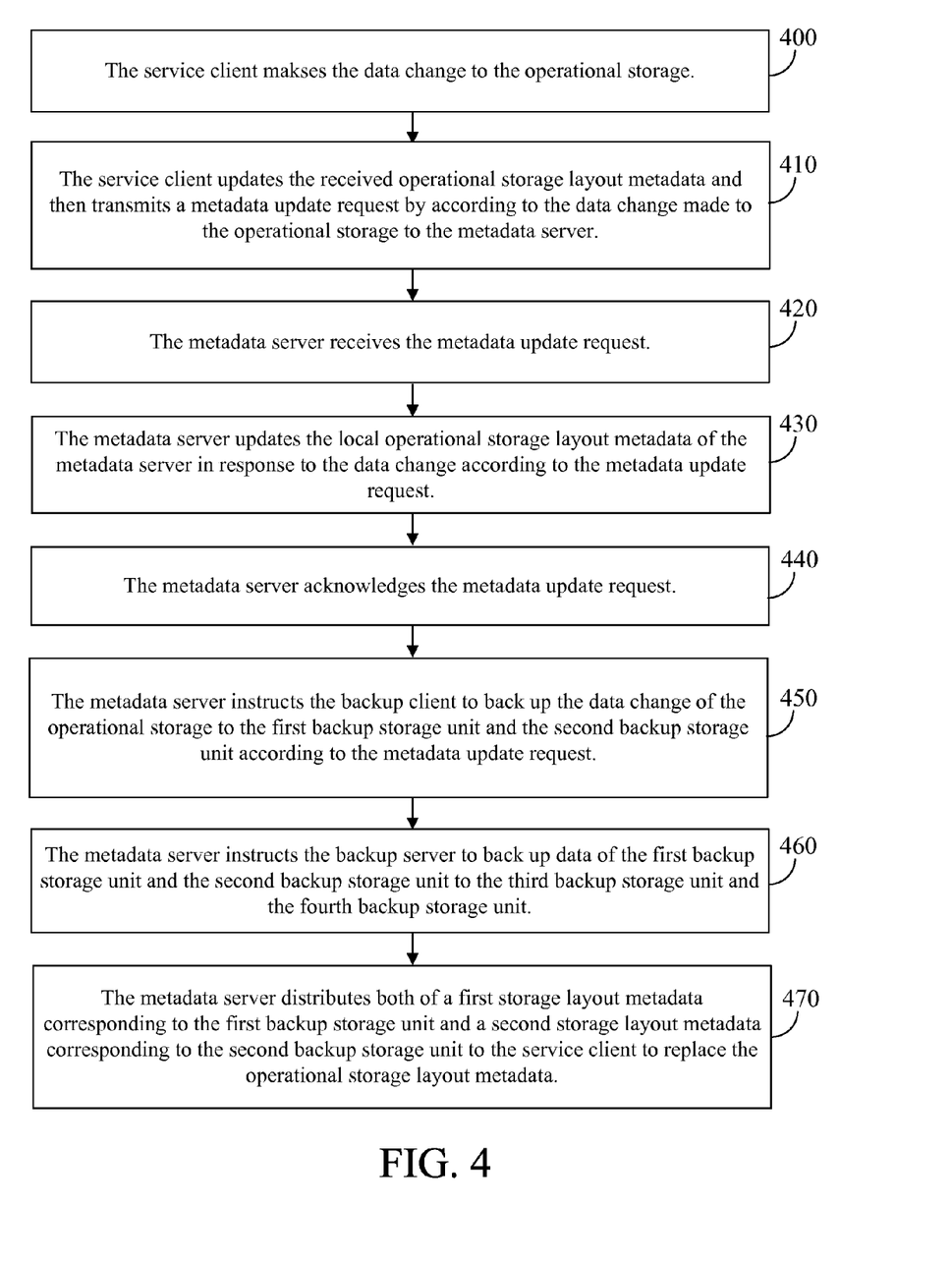
FIG. 4 is a flowchart diagram of a backup method according to a fourth embodiment of the present invention.

A fourth embodiment of the present invention is shown in FIG. 4 which depicts a backup method of the present invention. The backup method is used in a backup system which comprises a service client, a metadata server, a backup client, an operational storage and a backup storage.

Wherein, the backup storage serves as a backup storage set or group and comprises a first backup storage unit and a second backup storage unit.

The service client, the metadata server, the backup client, the operational storage, the first backup storage unit and the second backup storage unit in this embodiment have the same functions as the service client 10, the metadata server 20, the backup client 30, the operational storage 40, the first backup storage unit 51 and the second backup storage unit 52 of the second embodiment respectively.

The service client communicates with the metadata server and the operational storage via a local area network (LAN), a wide area network (WAN), a metropolitan area network (MAN), a global area network such as the Internet, a Fiber Channel fabric, or any combination of such interconnects.

The backup client is coupled with the metadata server, the operational storage and backup storage respectively. For example, the backup client may be electrically coupled with the metadata server, the operational storage, the first backup storage unit and the second backup storage unit.

In this embodiment, the first backup storage unit and the second backup storage unit may be located in the same place, or the first backup storage unit may be located close to the operational storage and the second backup storage unit may be remotely located from the operational storage.

Before the backup method is implemented, the metadata server configures the operational storage for the service client and transmits an operational storage layout metadata to the service client so that the service client can access the operational storage according to the operational storage layout metadata. The backup method is triggered and executed by the following steps.

Firstly in the backup method, a step 400 is executed by making the data change to the operational storage by the service client. Next, a step 410 is executed by updating the received operational storage layout metadata and then transmitting a metadata update request by according to the data change made to the operational storage to the metadata server by the service client.

And then, a step 420 is executed by receiving the metadata update request by the metadata server. Next, a step 430 is executed by updating the local operational storage layout metadata of the metadata server in response to the data change according to the metadata update request by the metadata server. Wherein the operational storage layout metadata updated by the service client is a cached copy of the local operational storage layout metadata updated by the metadata server, and the local operational storage layout metadata is a part of whole storage layout metadata stored in the metadata server.

Afterwards, a step 440 is executed by acknowledging the metadata update request by the metadata server.

Then, a step 450 is executed by instructing the backup client to back up the data change of the operational storage to the first backup storage unit and the second backup storage unit according to the metadata update request by the metadata server.

In one embodiment of step 450, the metadata server, instructs the backup client to back up the data change of the operational storage to the first backup storage unit and the second backup storage unit, by reading and then writing data from the operational storage into the first backup storage unit and moving cold data from the first backup storage unit to the second backup storage unit.

Accordingly, the data stored in the first backup storage unit is the backup data of the hot data which is written and read frequently in the operational storage. The data stored in the second backup storage unit is backup data of the cold data which is written and read infrequently in the operational storage.

For more details regarding to the attributions of the first backup storage unit and the second backup storage unit, in one embodiment, the first read/write speed of the first backup storage unit is faster than a second read/write speed of the second backup storage unit. In another embodiment, the volume of the first backup storage unit is less than the second backup storage unit.

Furthermore, if an unusable situation happens on the operational storage, a restore procedure will be executed. By the restore procedure, the metadata server configures the first backup storage unit and the second backup storage unit to be a new operational storage set to replace the original operational storage, and also configures a new backup storage for the first backup storage unit and the second backup storage unit.

For more details, the backup system further comprises a third backup storage unit and a fourth backup storage unit. Wherein, the backup client is coupled to the third backup storage unit and the fourth backup storage unit.

In this embodiment, the third backup storage unit and the fourth backup storage unit is configured to be the new backup storages for the first backup storage unit and the second backup storage unit respectively. Therefore, a step 460 is executed by instructing the backup client to back up data of the first backup storage unit and the second backup storage unit to the third backup storage unit and the fourth backup storage unit by the metadata server.

In the restore procedure, a step 470 is executed by distributing both of a first storage layout metadata corresponding to the first backup storage unit and a second storage layout metadata corresponding to the second backup storage unit to the service client to replace the operational storage layout metadata by the metadata server. The service client can then communicate with the first backup storage unit and the second backup storage unit and can access the first backup storage unit and the second backup storage unit according to the first storage layout metadata and the second storage layout metadata respectively.

It should be noted that the restore procedure (the steps 460 and 470) will not be executed if the unusable situation does not happen. With the same concept, the third backup storage unit and the fourth backup storage unit will be accessed by the service client when the first backup storage unit and the second backup storage unit are unusable.

In addition to the aforesaid steps, the backup method of the fourth embodiment can also execute all the operations and functions of the backup system of the second embodiment.

With the foregoing description, it is known that the present invention provides a real-time backup method and also a backup method in multiple backup storages.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A backup system, comprising:
    an operational storage;
    a backup storage, comprising a first backup storage unit and a second backup storage unit;
    a service client communicated with the operational storage, being configured to access the operational storage according to an operational storage layout metadata corresponding to the operational storage, to make a data change to the operational storage and to transmit a metadata update request by according to the data change made to the operational storage;
    a backup client coupled with the operational storage and the backup storage respectively; and
    a metadata server communicated with the service client and coupled with the backup client, wherein when the metadata server receives the metadata update request from the service client, updates a local operational storage layout metadata in response to the data change according to the metadata update request, acknowledges the metadata update request and instructs the backup client to back up the data change of the operational storage to the backup storage according to the metadata update request;
    wherein the backup client backs up the operational storage by reading data change from the operational storage and then writing the read data change into the first backup storage unit and then moving cold data from the first backup storage unit to the second backup storage unit.

2. The backup system as claimed in claim 1, wherein the backup system further comprises a other backup storage, the metadata server instructs the backup server to back up data of the backup storage to the other backup storage, and the metadata server distributes a backup storage layout metadata corresponding to the backup storage to the service client to replace the operational storage layout metadata so that the service client accesses the backup storage according to the backup storage layout metadata.

3. The backup system as claimed in claim 1, wherein a first read/write speed of the first backup storage unit is faster than a second read/write speed of the second backup storage unit.

4. The backup system as claimed in claim 1, wherein the backup system further comprises a third backup storage unit and a fourth backup storage unit, the metadata server instructs the backup server to back up data of the first backup storage unit to the third backup storage unit and to back up data of the second backup storage unit to the fourth backup storage unit, and the metadata server distributes a first storage layout metadata corresponding to the first backup storage unit and a second storage layout metadata corresponding to the second backup storage unit to the service client to replace the operational storage layout metadata so that the service client accesses the first backup storage unit and the second backup storage unit according to the first storage layout metadata and the second storage layout metadata respectively.

5. A backup method for use in a backup system, the backup system comprising an operational storage, a backup storage which comprises a first backup storage unit and a second backup storage unit, a service client, a metadata server and a backup client, wherein the metadata server communicates with the service client and is coupled to the backup client, the backup client is coupled to the operational storage and the backup storage, the service client communicates with the operational storage and is configured to access the operational storage according to an operational storage layout metadata corresponding to the operational storage, the backup method comprising:
    making a data change to the operational storage to transmit a metadata update request to the metadata server by the service client;
    receiving the metadata update request from the service client by the metadata server;
    updating a local operational storage layout metadata in response to the data change according to the metadata update request by the metadata server;
    acknowledging the metadata update request by the metadata server; and
    instructing the backup client to back up the data change of the operational storage to the backup storage according to the metadata update request by the metadata server;
    wherein the backup client backs up the operational storage by reading data change from the operational storage and then writing the read data change into the first backup storage unit and moving cold data from the first backup storage unit to the second backup storage unit.

6. The backup method as claimed in claim 5, wherein the backup system further comprises a other backup storage, the backup method further comprising:
    instructing the backup server to back up data of the backup storage to the other backup storage by the metadata server; and
    distributing a backup storage layout metadata corresponding to the backup storage to the service client to replace the operational storage layout metadata by the metadata server so that the service client accesses the backup storage according to the backup storage layout metadata.

7. The backup method as claimed in claim 5, wherein a first read/write speed of the first backup storage unit is faster than a second read/write speed of the second backup storage unit.

8. The backup method as claimed in claim 5, wherein the backup system further comprises a third backup storage unit and a fourth backup storage unit, the backup method further comprising:
    instructing the backup server to back up data of the first backup storage unit to the third backup storage unit and to back up data of the second backup storage unit to the fourth backup storage unit by the metadata server; and
    distributing a first storage layout metadata corresponding to the first backup storage unit and a second storage layout metadata corresponding to the second backup storage unit to the service client to replace the operational storage layout metadata by the metadata server so that the service client accesses the first backup storage unit and the second backup storage unit according to the first storage layout metadata and the second storage layout metadata respectively.

* * * * *